United States Patent
Son et al.

(10) Patent No.: US 10,113,759 B2
(45) Date of Patent: Oct. 30, 2018

(54) AIR CONDITIONER AND CONTROL METHOD THEREOF

(71) Applicant: LG ELECTRONICS INC., Seoul (KR)

(72) Inventors: Sanghyuk Son, Seoul (KR); Jungwoo Lee, Seoul (KR); Younggu Lee, Seoul (KR); Unchang Jeong, Seoul (KR); Chungook Chong, Seoul (KR); Taeyoon Kim, Seoul (KR); Jieun Choi, Seoul (KR); Kunyoung Lee, Seoul (KR); Jongsu Lee, Seoul (KR); Kyoungho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 146 days.

(21) Appl. No.: 15/337,974

(22) Filed: Oct. 28, 2016

(65) Prior Publication Data
US 2017/0122606 A1    May 4, 2017

Related U.S. Application Data

(60) Provisional application No. 62/248,463, filed on Oct. 30, 2015, provisional application No. 62/355,118, filed on Jun. 27, 2016.

(30) Foreign Application Priority Data

Nov. 7, 2015 (KR) .......... 10-2015-0156254
Dec. 24, 2015 (KR) .......... 10-2015-0185850
(Continued)

(51) Int. Cl.
*F24F 3/00* (2006.01)
*B01F 3/04* (2006.01)
(Continued)

(52) U.S. Cl.
CPC ............ *F24F 6/16* (2013.01); *B01F 3/04035* (2013.01); *B05B 7/0081* (2013.01);
(Continued)

(58) Field of Classification Search
CPC F24F 3/14; B01F 3/04; B01F 3/04021; B01F 3/04028; B01F 3/04035
(Continued)

(56) References Cited

U.S. PATENT DOCUMENTS 3,188,007 A    6/1965 Myklebust

FOREIGN PATENT DOCUMENTS

| JP | 2003-339817 A | 12/2003 |
| JP | 2004-154535 A | 6/2004 |

(Continued)

OTHER PUBLICATIONS

LG Electronics Inc.—LG Signature Catalog, "Model Name: AW141YAW", Mar. 17, 2016.

*Primary Examiner* — Robert A Hopkins
(74) *Attorney, Agent, or Firm* — Dentons US LLP (57) ABSTRACT

Provided is an air conditioner. The air conditioner includes a water tank to store water, a visual body disposed over the water tank and formed of a transparent material, a watering housing to draw water stored in the water tank and to spray the drawn water to the visual body, a water level sensor to measure a water level of the water tank in a multi-stage, a top cover assembly disposed over the visual body and having a water supply hole to supply water to the water tank, and a water level display unit disposed beside the water supply hole of the top cover assembly to display a water level measured by the water level sensor in a multi-stage.

11 Claims, 9 Drawing Sheets

(30) Foreign Application Priority Data

Mar. 28, 2016 (KR) ........................ 10-2016-0037235
Jun. 30, 2016 (KR) ........................ 10-2016-0083062
Oct. 6, 2016 (KR) ........................ 10-2016-0129319

(51) Int. Cl.
    *F24F 6/16*     (2006.01)
    *F24F 13/20*     (2006.01)
    *F24F 11/00*     (2018.01)
    *B05B 7/24*     (2006.01)
    *B05B 7/00*     (2006.01)
    *B05B 12/08*     (2006.01)
    *G01F 23/30*     (2006.01)
    *G01F 23/00*     (2006.01)
    *F24F 3/14*     (2006.01)
    *F24F 6/00*     (2006.01)
    *F24F 11/52*     (2018.01)

(52) U.S. Cl.
    CPC .......... *B05B 7/2402* (2013.01); *B05B 12/081* (2013.01); *F24F 3/14* (2013.01); *F24F 11/0008* (2013.01); *F24F 13/20* (2013.01); *G01F 23/0007* (2013.01); *G01F 23/30* (2013.01); *F24F 11/52* (2018.01); *F24F 2006/008* (2013.01); *F24F 2011/0091* (2013.01)

(58) Field of Classification Search
    USPC ........................................................ 261/72.1
    See application file for complete search history.

(56) References Cited

FOREIGN PATENT DOCUMENTS

| | | | |
|---|---|---|---|
| JP | 2010-216710 A | 9/2010 | |
| JP | 2015-59671 A | 3/2015 | |
| KR | 10-2006-0055004 A | 5/2006 | |
| KR | 10-2006-0055006 A | 5/2006 | |
| WO | WO-2009070902 A1 * | 6/2009 | .............. F24F 6/043 |
| WO | 2013/141549 A1 | 9/2013 | |
| WO | 2015/016657 A1 | 2/2015 | |

* cited by examiner

AIR CONDITIONER AND CONTROL METHOD THEREOF

CROSS-REFERENCE TO RELATED APPLICATIONS

This U.S. non-provisional patent application claims priority under 35 U.S.C. § 119 of U.S. Provisional Application No. 62/248,463, filed on Oct. 30, 2015, U.S. Provisional Application No. 62/355,118, filed on Jun. 27, 2016, Korean Patent Application No. 10-2015-0156254, filed on Nov. 7, 2015, Korean Patent Application No. 10-2015-0185850, filed on Dec. 24, 2015, Korean Patent Application No. 10-2016-0037235, filed on Mar. 28, 2016, Korean Patent Application No. 10-2016-0083062, filed on Jun. 30, 2016, and Korean Patent Application No. 10-2016-0129319 Oct. 6, 2016, the entire contents of which are hereby incorporated by reference.

BACKGROUND OF THE INVENTION

The present invention disclosed herein relates to an air conditioner and a control method thereof, and more particularly, to an air conditioner for measuring and displaying a water level of a water tank that stores water for humidification in a multi-stage and a control method thereof.

An air conditioner is an apparatus that changes the interior space into a pleasant environment by allowing air to flow and thus cooling, heating, purifying or humidifying air. Such an air conditioner includes a water tank for storing water for humidification. If a user is notified only when there is no water in such a water tank, the user may not know in advance when to replenish water in a water tank, and if a user is notified only when water is full during the replenishing of water in a water tank, water overflow may occur.

SUMMARY OF THE INVENTION

The present invention provides an air conditioner for measuring and displaying a water level of a water tank in a multi-stage and a control method thereof.

The present invention also provides an air conditioner for subdividing the water level measurement of a water tank to perform a measurement continuously and a control method thereof.

The present invention also provides an air conditioner for accurately displaying a water level of a water tank and a control method thereof.

The objectives of the present invention are not limited to the above-mentioned objectives, and other objectives that are not mentioned will be clearly understood by persons skilled in the art from the following description.

Embodiments of the present invention provide air conditioner including: a water tank to store water; a visual body disposed at an upper for of the water tank and formed of a transparent material; a watering housing to draw water stored in the water tank and to spray the drawn water to the visual body; a water level sensor to measure a water level of the water tank in a multi-stage; a top cover assembly disposed at an upper part of the visual body and including a water supply hole to supply water to the water tank; and a water level display unit disposed around the water supply hole of the top cover assembly to display a water level measured by the water level sensor in a multi-stage.

In some embodiments, the water tank may comprise a floater to move vertically according to a water level of the water tank and to generate a magnetic force, the water level sensor comprises a plurality of hole sensors to detect a magnetic force generated by the floater and to output a signal, and at least one of the plurality of hole sensors detects a magnetic force generated by the floater to output a signal.

In some embodiments, the air conditioner may further comprise a control unit to receive a signal from the water level sensor to determine a water level of the water tank.

In some embodiments, when there is one hole sensor outputting a signal among the plurality of hole sensors, the control unit may determine a water level of the water tank by the one hole sensor outputting the signal and may display the determined water level on the water level display unit.

In some embodiments, when there are two hole sensors outputting signals among the plurality of hole sensors, the control unit may determine a water level of the water tank by the hole sensor disposed higher between the two hole sensors outputting the signals and displays the determined water level on the water level display unit.

In some embodiments, the air conditioner may further comprises a control unit to wait for a water level display change time after the water level sensor measures a water level drop of the water tank and to change a water level displayed on the water level display unit.

In some embodiments, the control unit may calculate the water level display change time from an unmeasurable amount, that is the amount of water recovered in the water tank after the stopping of the operation of the watering motor, and an evaporation rate, that is the amount of evaporated water per hour due to humidification.

In other embodiments of the present invention, provided are control methods of air conditioner including a water tank to store water, a water level sensor including a plurality of hole sensors to measure a water level of the water tank in a multi-stage, a floater disposed at the water tank to move vertically according to a water level, and a water level display unit to display a water level measured by the water level sensor in a multi-stage. The control methods include: when there is one hole sensor outputting a signal by detecting a magnetic force generated by the floater, determining a water level of the water tank by the one hole sensor outputting the signal; and when there are two hole sensors outputting signals by detecting a magnetic force generated by the floater among the plurality of hole sensors, determining a water level of the water tank by the hole sensor disposed higher between the two hole sensors outputting the signals.

In some embodiments, the control method may further comprises displaying the determined water level of the water tank on a water level display unit disposed beside a water supply hole to supply water to the water tank and to display a water level measured by the water level sensor in a multi-stage.

In some embodiments, the control method may further comprises: measuring, by the water level sensor, a water level drop of the water tank; waiting for a water level display change time after measuring the water level drop of the water tank; and displaying a water level change on the water level display unit, disposed beside the water supply hole for supplying water to the water tank, after the water level display change time.

In some embodiments, the water level display change time may be calculated from an unmeasurable amount, that is the amount of water recovered in the water tank after stopping an operation of a watering motor, and an evaporation rate, that is the amount of evaporated water per hour due to humidification.

In some embodiments, the control method may further comprises, when it is determined that there is no water in the water tank, stopping spraying water stored in the water tank.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Hereinafter, air conditioner and control methods thereof according to exemplary embodiments of the present invention will be described in detail with reference to the accompanying drawings.

Figure 1:
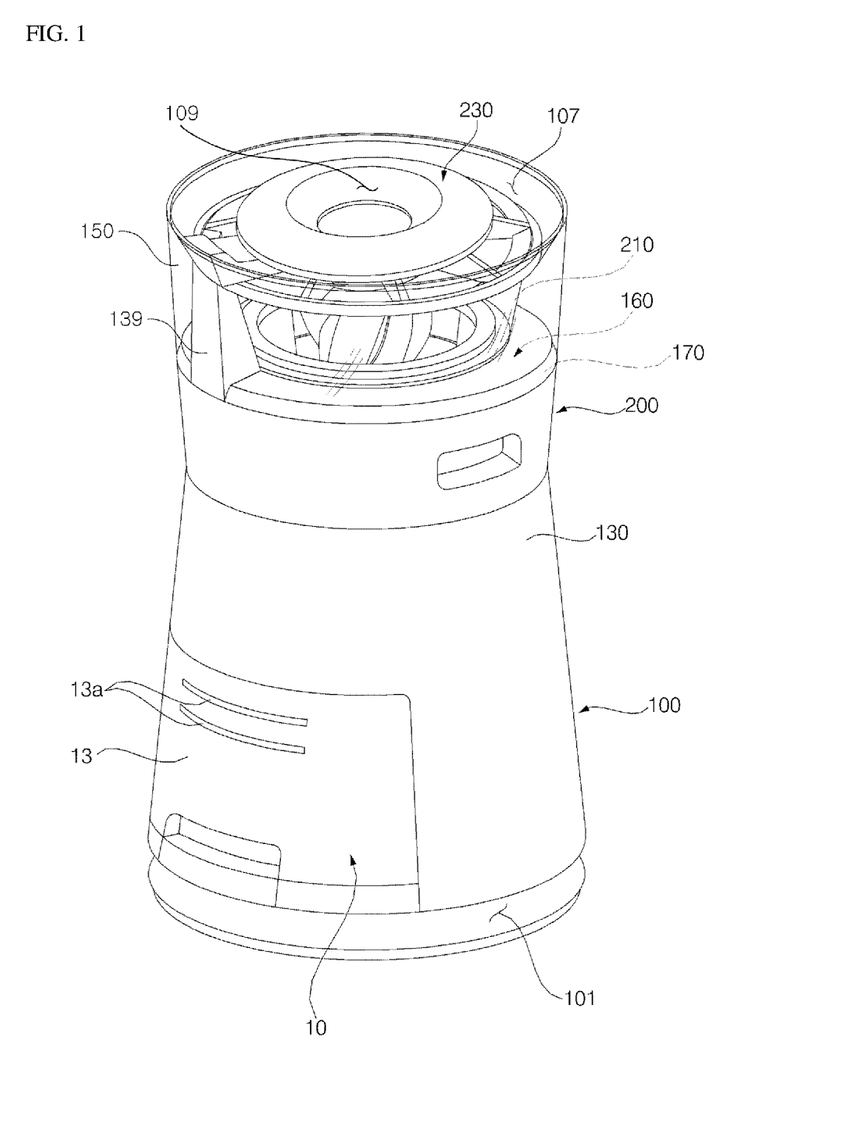
FIG. 1 is a perspective view illustrating an air conditioner according to an embodiment of the present invention.
Figure 2:
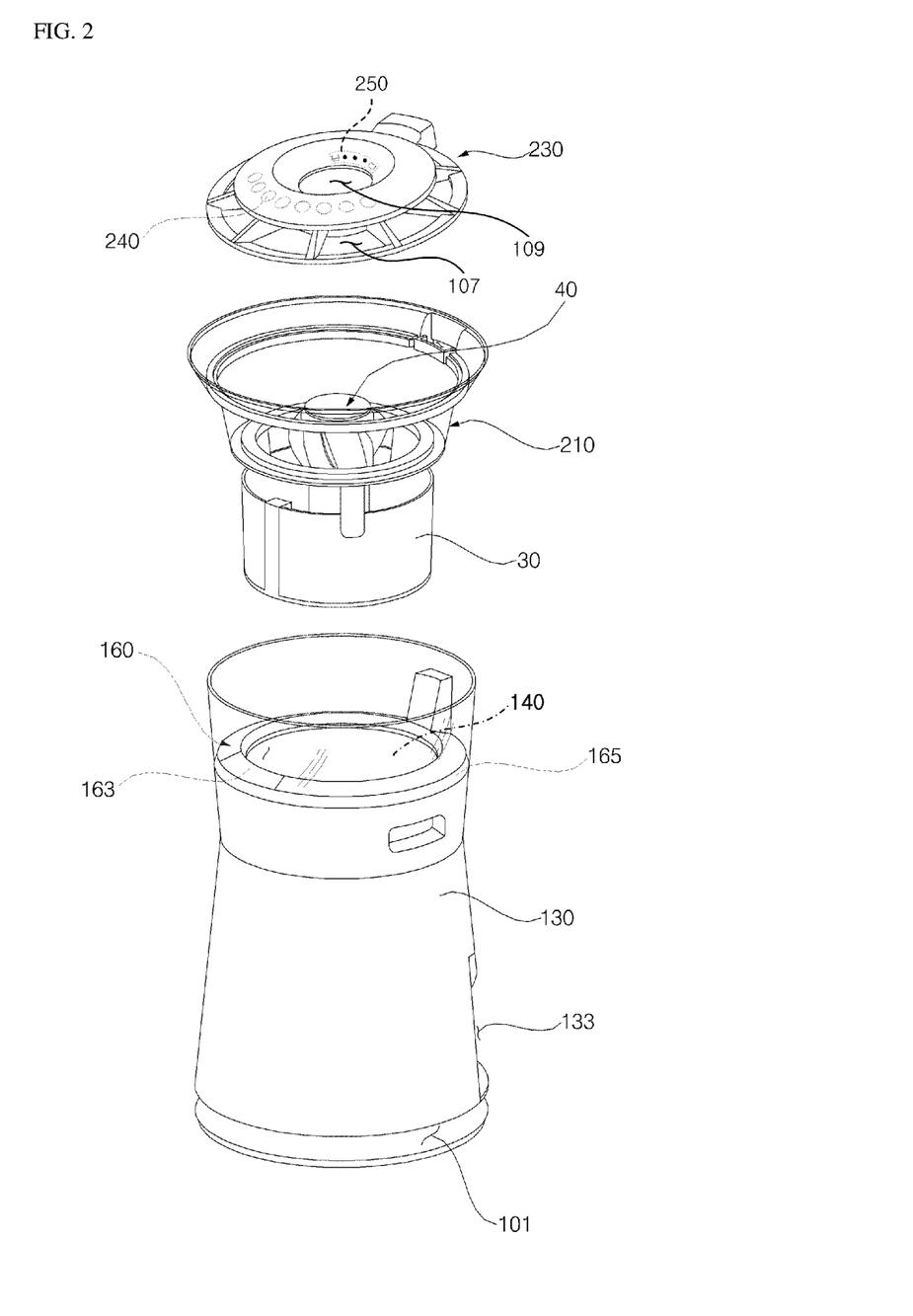
FIG. 2 is an exploded perspective view illustrating an air conditioner according to an embodiment of the present invention.
Figure 3:
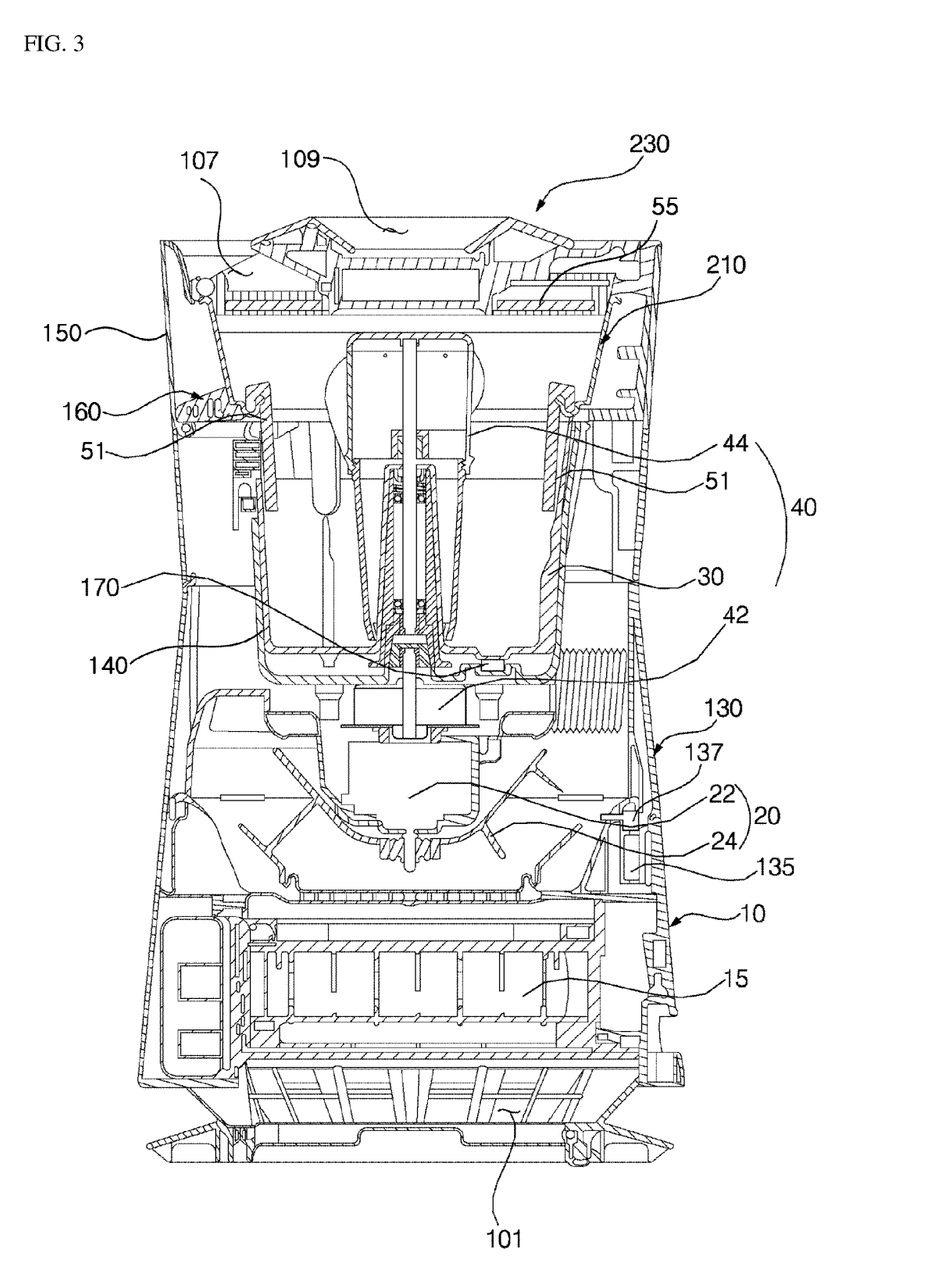
FIG. 3 is a cross-sectional view illustrating an air conditioner according to an embodiment of the present invention.

FIG. 1 is a perspective view illustrating an air conditioner according to an embodiment of the present invention. FIG. 2 is an exploded perspective view illustrating an air conditioner according to an embodiment of the present invention. FIG. 3 is a cross-sectional view illustrating an air conditioner according to an embodiment of the present invention.

An air conditioner according to an embodiment of the present invention may include a cleaning module 100 receiving external air and then cleaning air, and a humidification module 200 providing moisture to air cleaned in the cleaning module 100.

The air conditioner may include a base body 130 for supporting the air conditioner from the bottom and forming the appearance, a filter assembly 10 disposed separably from the base body 110 and cleaning air, a blower unit 20 disposed inside the base body 130 to allow air to flow, and a cylindrical mounting body 140 disposed inside the base body 130 and including a water tank 30 inserted.

The base body 130 may form the appearance of the air conditioner. The upper part of the base body 130 may be formed of a transparent material through which a use can see the inside. An inlet 101 for receiving external air may be formed at the lower part of the base body 130. A filter installation opening part 133 where the filter assembly 10 is inserted may be formed at one side of the base body 130. A blower unit 20 may be disposed at the upper side of the filter installation opening part 133 inside the base body 130. The mounting body 140 may be disposed at the upper side of the blower unit 20 inside the base body 130. The mounting body 140 may be disposed at the upper part of a watering motor 42. A display module 160 may be disposed at the upper side of the mounting body 140. A ring-shaped space may be formed between the outer surface of the mounting body 140 and the inner surface of the base body 130 to allow air blown by the blower fan 24 of the blower unit 20 to flow upwardly. The water tank 30 and a visual body 210 may be inserted into the base body 130.

The blower unit 20 may be disposed inside the base body 130 to allow air to be entered through the inlet 101 and discharged through an outlet 107. The blower unit 20 may be disposed between the filter assembly 10 and a spray unit 40. The blower unit 20 may blow clean air from the filter assembly 10 to a lower humidification medium 51 and an upper humidification medium 55. The blower unit 20 may include a blower fan 24 for blowing air and a blower motor 22 for rotating the blower fan 24. Air blown from the blower fan 24 may flow to the humidification module 200. The blower fan 24 may blow air to the lower humidification medium 51 and the upper humidification medium 55 described later. The blower motor 22 may be a brushless DC (BLDC) motor whose rotating speed can be controlled. The blower motor 22 may rotate the blower fan 24 in various rotating speeds.

The filter assembly 10 may be detachably disposed inside the base body 130 to clean air entered to the inlet 101. The filter assembly 10 may be disposed at the lower part of the blower unit 20. Air cleaned by the filter assembly 10 may flow to the blower unit 20.

The filter assembly 10 may include a filter cover 13 for shielding the filer installation opening part 133 when installed to the base body 130 and an electrostatic precipitation module 15 for charging foreign materials (for example, dust and so on) in air with electricity to clean the air. The filter assembly 10 may further include a pre-filter (not shown) for filtering foreign materials in air entered through the inlet 101 and a deodorizing filter (not shown) for deodorizing a bad smell in air. A detection opening part 13a open to allow external air to flow into an air state sensor unit 135 described later may be formed at the filter cover 13.

The humidification module 200 may include a visual body 210 detachably coupled to the cleaning module 100 and formed of a transparent material through which a user can see the inside, a cylindrical water tank 30 coupled to the visual body 210 and storing water, a watering unit 40 for drawing water stored in the water tank 30 and spraying the water, a lower humidification medium 51 and an upper humidification medium 55 wetted with water sprayed from the watering unit 40 to contain a moisture and humidifying passing-through air, and a top cover assembly 230 disposed at the upper end of the visual body 210.

The visual body 210 may be disposed inside the upper part of the base body 130. The visual body 210 may be disposed at the upper part of the water tank 30 and thus, its lower end may be coupled to the water tank 30. The visual body 210 may reflect and scatter water sprayed from the watering unit 40. The visual body 210 may be disposed at the upper part of the base body 130 so that a user can see water scattered inside the visual body 210 through an upper transparent portion of the base body 130. The lower humidification medium 51 may be separably disposed at the lower side of the visual body 210 and the upper humidification medium 55 may be separably disposed at the upper side.

The water tank 30 may store water. The water tank 30 may be disposed inside base body 130. The water tank 30 may be inserted into the mounting body 140 of the base body 130. The upper end of the water tank 30 may be coupled with the visual body 210 so that the water tank 30 may be separated from the cleaning module 100 together with the visual body 210. A space may be formed between the visual body 210 and the water tank 30 and air passing through between the base body 130 and the mounting body 140 may flow as the blower fan 24 of the blower unit 20 blows air.

The lower humidification medium 51 may be disposed between the visual body 210 and the water tank 30. The lower humidification medium 51 may be separably coupled to the lower end of the visual body 210 to be disposed so as to prevent water stored in the water tank 30 from directly contacting it. The lower humidification medium 51 may be wet with water sprayed and scattered by the watering unit 40. The lower humidification medium 51 may be formed of a material that is capable of containing moisture. Air flowing to the space between the visual body 210 and the water tank 30 may pass through the lower humidification medium 51. The lower humidification medium 51 may contain moisture and humidify passing-through air.

The watering unit 40 may include a rotatable watering housing 44 for drawing and spraying water in the water tank 30 and a watering motor 42 for rotating the watering housing 44. The watering housing 44 is rotated by the watering motor 42 to draw and spray water in the water tank 30. The watering housing 44 may spray water to the visual body 210 to supply moisture to the upper humidification medium 55 and the lower humidification medium 51. The watering housing 44 may be disposed inside the water tank 30 to be separated together with the water tank 30. The watering motor 42 may be disposed at the lower side of the watering housing 44 and disposed at the upper side of the blower motor 22. The watering motor 42 may be a brushless DC (BLDC) motor whose rotating speed can be controlled. The watering motor 42 may rotate the watering housing 44 in various rotating speeds.

Since the watering housing 44 holds water in the water tank 30 during rotation and water sprayed from the watering housing 44 exists on the inner surface of the visual body 210 and the inner surface of the water tank 30, when the watering housing 44 starts to rotate, a water level of the water tank 30 becomes lower and when the watering housing 44 stops rotating, a water level of the water tank 30 becomes higher.

The top cover assembly 230 may be disposed at the upper part of the visual body 210 to cover the upper side of the visual body 210. The top cover assembly 230 may be separably coupled with the visual body 210 to cover the water tank 30. A ring-shaped outlet 107 through which air humidified after passing through the lower humidification medium 51 and the upper humidification medium 55 is discharged to the outside may be formed at the top cover assembly 230. A circular water supply hole 109 for supplying water to the water tank 30 may be formed at the center part of the top cover assembly 230. A user may pour water in the water supply hole 109 of the top cover assembly 230 to supply the water to the water tank 30.

An operation module 240 may be disposed between the outlet 107 and the water supply hole 109 of the top cover assembly 230. A water level display unit 250 may be disposed beside the water supply hole 109 of the top cover assembly 230.

The upper humidification medium 55 may be disposed at the lower part of the top cover assembly 230. The upper humidification medium 55 may be separably disposed at the upper side of the visual body 210. The upper humidification medium 55 may be wet with water sprayed and scattered by the watering unit 40. The upper humidification medium 55 may be formed of a material that is capable of containing moisture. Air discharged to the outlet 107 of the visual body 210 may pass through the upper humidification medium 55. The upper humidification medium 55 may contain moisture and humidify passing-through air.

The air state sensor unit 135 may measure an air state at a place where an air conditioner is installed. The air state refers to a relative humidity of air, a dust state, or an odor state. The air state sensor unit 135 may include at least one of a humidity sensor for measuring a relative humidity by detecting the temperature and humidity of air, a dust sensor for measuring a dust state by detecting a dust concentration in air, and an odor sensor for measuring an odor state by detecting a material that causes an odor in air.

The operation module 240 may receive an instruction from a user. The operation module 240 may be disposed at the upper surface of the top cover assembly 230. Through the operation module 240, a user may input various instructions for controlling operations of an air conditioner.

The display module 160 may display a state of an air conditioner. The display module 160 may be formed in a ring shape and disposed inside the base body 130. The display module 160 may be disposed to allow a user to see it through a transparent portion at the upper part of the base body 130. A user may check an air state, a current operation mode, and other setting states through the display module 160. The mounting body 140 may be disposed at the lower side of the display module 160.

The display module 160 may include a state display unit 163 for displaying a state of an air conditioner through an icon or a letter and a lighting unit 165 for displaying a state of an air conditioner through light of various colors. The state display unit 163 may display an air state, an operation mode, or other setting states through an icon or a letter. The lighting unit 165 may display an air state by emitting light of various colors.

The water level display unit 250 may be disposed nearby the water supply hole 109 of the top cover assembly 230 to display a water level of water stored in the water tank 30 in a multi-stage. This will be described in more detail later.

An ion generation module 137 may generate ions to remove bacteria or viruses. The ion generation module 137 may be disposed inside base body 130. The ion generation module 137 may be disposed on a flow passage of air that flows by the blower fan 24 of the blower unit 20. The ion generation module 137 may ionize molecules as high voltage is applied. The ions generated by the ion generation module 137 may flow to the lower humidification medium 51 by the blower fan 24 of the blower unit 20. Since continuous ion generation is harmful for a user, it may be desirable that the ion generation module 137 operates only in a specific mode or by a user setting.

An ultraviolet module 170 may emit ultraviolet light to remove bacteria or viruses. The ultraviolet module 170 may emit ultraviolet light toward water stored in the water tank 30 to remove bacteria or viruses, which are propagated from the water stored in the water tank 30.

Figure 4:
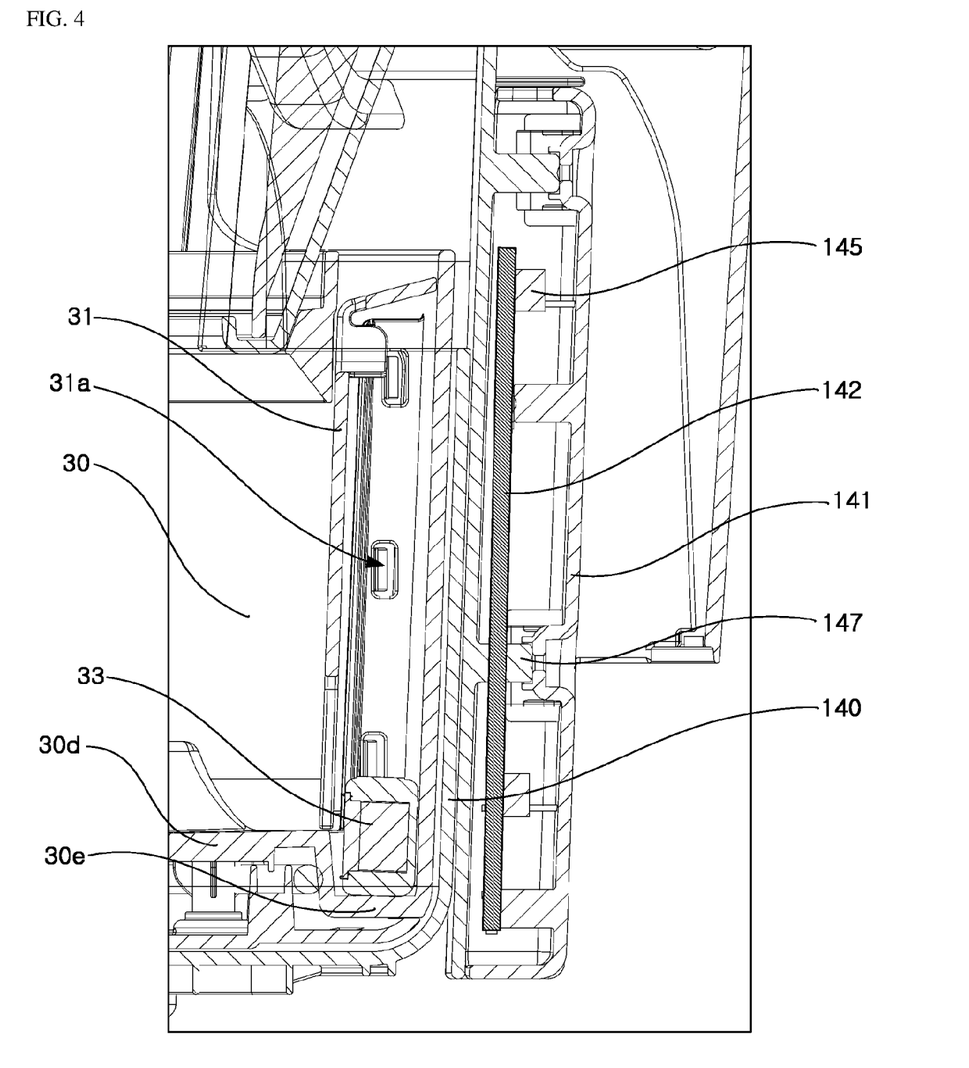
FIG. 4 is a partial cross-sectional view illustrating an air conditioner according to an embodiment of the present invention.
Figure 5:
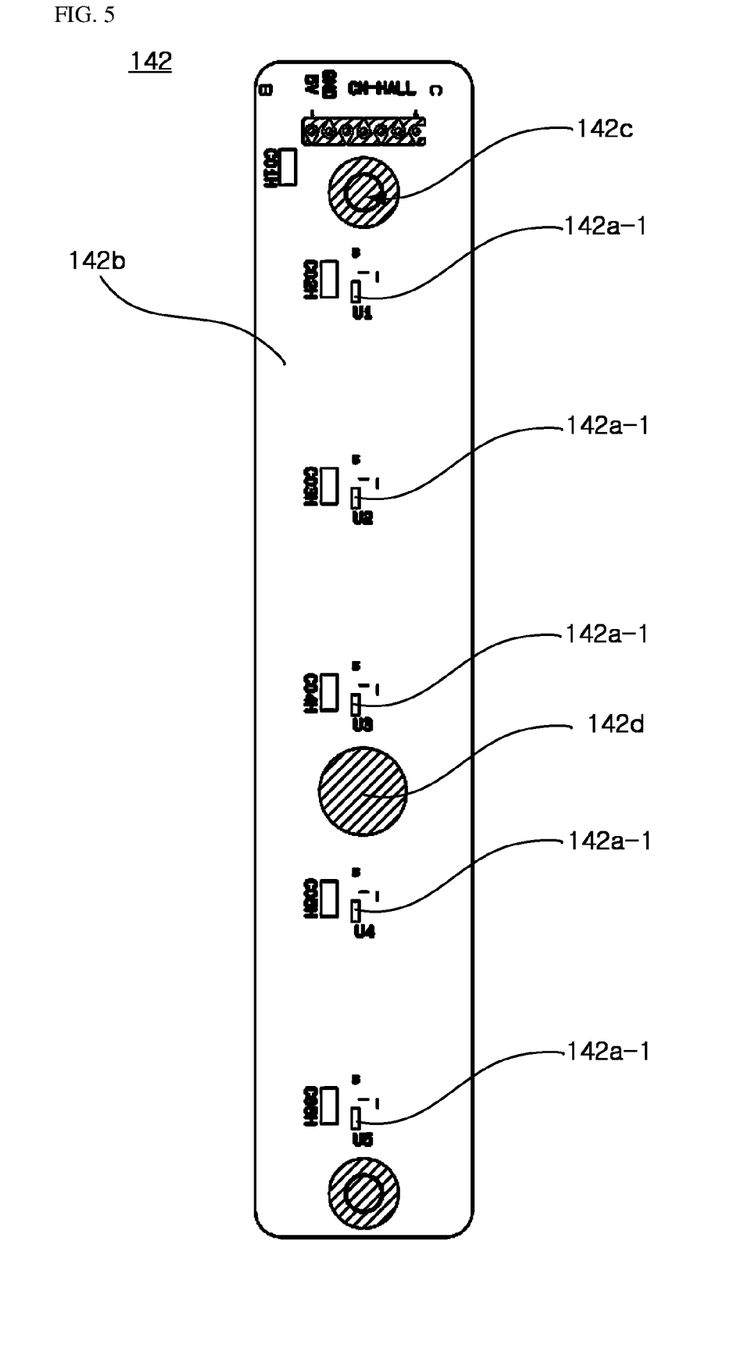
FIG. 5 is a view illustrating a water level sensor of an air conditioner according to an embodiment of the present invention.

FIG. 4 is a partial cross-sectional view of an air conditioner according to an embodiment of the present invention. FIG. 5 is a view illustrating a water level sensor of an air conditioner according to an embodiment of the present invention.

A water tank 30 may include a floater 33 moving vertically according to the height of water contained in the water tank 30 and a floater cover 31 disposed at the inner sidewall surface of the water tank 30 to receive the floater 33. The floater 33 may include a permanent magnet that generates a magnetic force therein. The floater 33 may move vertically according to a water level of the water tank 30 in the floater cover 31. In this embodiment, the vertical direction means the gravity direction.

The floater cover 31 may be disposed at the inner sidewall surface of the water tank 30. A movement path of the floater 33, which is formed long vertically, may be formed at the floater cover 31. A cover hole 31a where water stored in the water tank 30 flows may be formed at the floater cover 31. A portion 30e where the floater cover 31 is disposed in the undersurface of the water tank 30 may have a deeper depth than a middle portion 30d where the floater cover 31 of the water tank 30 is not disposed. The portion 30e where the floater cover 31 is disposed in the undersurface of the water tank 30 may be drawn downwardly, so that when the floater 33 is located at the lowest side, the center part of the floater 33 may have the same height as the middle portion 30d the undersurface of the water tank 30.

An air conditioner according to an embodiment of the present invention may include a water level sensor cover 141 disposed at the outer wall surface of the mounting body 140 and including a water level sensor 142 received and a water level sensor 142 for measuring a water level of water stored in the water tank 30 by detecting a magnetic force generated by the floater 33. The water level sensor cover 141 may be disposed at the outer sidewall surface of the mounting body 140 in correspondence to a movement path of the floater 33. A cylindrical water level sensor boss 145 for fixing the water level sensor 142 may be formed at the water level sensor cover 141. In this embodiment, two water level sensor bosses 145 may be formed and disposed vertically. A cover terminal 147 for supplying power to the water level sensor 142 and receiving a signal from the water level sensor 142 may be disposed at the water level sensor cover 141.

The water level sensor 142 may measure a water level of the water tank 30 in a multi-stage. The water level measured by the water level sensor 142 may be displayed on the water level display unit 250 in a multi-stage.

The water level sensor 142 may be disposed in correspondence to a movement path of the floater 33 of the water tank 30. The water level sensor 142 may be disposed inside the water level sensor cover 141. Referring to FIG. 5, the water level sensor 142 may include a plurality of hole sensors 142a for detecting a magnetic force generated by the floater 33, a sensor substrate 142b formed long vertically and including the plurality of hole sensors 142a disposed, and a sensor terminal 142d disposed on the sensor substrate 142b to receive power from the cover terminal 147 and transmitting a signal to the cover terminal 147.

The plurality of hole sensors 142a may be vertically disposed at equal intervals on the sensor substrate 142b. In this embodiment, the plurality of hole sensors 142a may be provided in five, and may be disposed from the lower side in the order of a first hole sensor 142a-1, a second hole sensor 142a-2, a third hole sensor 142a-3, a fourth hole sensor 142a-4, and a fifth hole sensor 142a-5. That is, the second hole sensor 142a-2 may be disposed on the first hole sensor 142a-1. The third hole sensor 142a-3 may be disposed on the second hole sensor 142a-2. The fourth hole sensor 142a-4 may be disposed on the third hole sensor 142a-3. The fifth hole sensor 142a-5 may be disposed on the fourth hole sensor 142a-4. In this embodiment, since the water level sensor 142 includes five hole sensors 142a, the water level sensor 142 may measure a water level of the water tank 30 in five steps. When detecting a magnetic force of the floater 33, the hole sensor 142a may output a signal and at this point, the signal is a voltage value.

The plurality of hole sensors 142a may be disposed spaced at appropriate equal intervals in order to prevent a case that the floater 33 does not detect an occurring magnetic force. In order to allow at least one of the plurality of hole sensors 142a to detect a magnetic force generated by the floater 33, an interval between the plurality of hole sensors 142a and a magnetic force of the floater 33 may be configured. When the floater 33 is disposed between two adjacent hole sensors 142a among the plurality of hole sensors 142a, in order to allow all two hole sensors 142a to detect the magnetic force of the floater 33, an interval between the plurality of hole sensors 142a and the magnetic force of the floater 33 may be configured. In order to prevent more than three hole sensors 142a among the plurality of hole sensors 142a from detecting the magnetic force of the floater 33 at the same time in a normal state, an interval between the plurality of hole sensors 142a and the magnetic force of the floater 33 may be configured. That is, only one or two hole sensors 142a among the plurality of hole sensors 142a may detect the magnetic force of the floater 33.

Since at least one among the plurality of hole sensors 142a of the water level sensor 142 detects the magnetic force of the floater 33, the water level sensor 142 may measure a water level of the water tank 30 continuously from an empty water level of the water tank 30 to a full water level of the water tank 30.

The sensor substrate 142b may be coupled to the inside of the water level sensor cover 141. In relation to the sensor substrate 142b, a boss hole 142c may be formed at a position corresponding to the water level sensor boss 145 of the water level sensor cover 141. In this embodiment, two boss holes 142c may be formed. One boss hole 142c may be disposed at the lower side of the first hole sensor 142a-1 and the other one may be disposed at the upper side of the fifth hole sensor 142a-5.

The sensor terminal 142d may be disposed to contact the cover terminal 147. The sensor terminal 142d may receive power and deliver it to the plurality of hole sensors 142a. In this embodiment, it is desirable that when detecting the magnetic force of the floater 33, the plurality of hole sensors 142a output different voltage values and mutually distinguish them. When detecting the magnetic force of the floater 33, the plurality of hole sensors 142a may output different signals and the outputted signals may be delivered to the cover terminal 147 through the sensor terminal 142d.

Figure 6:
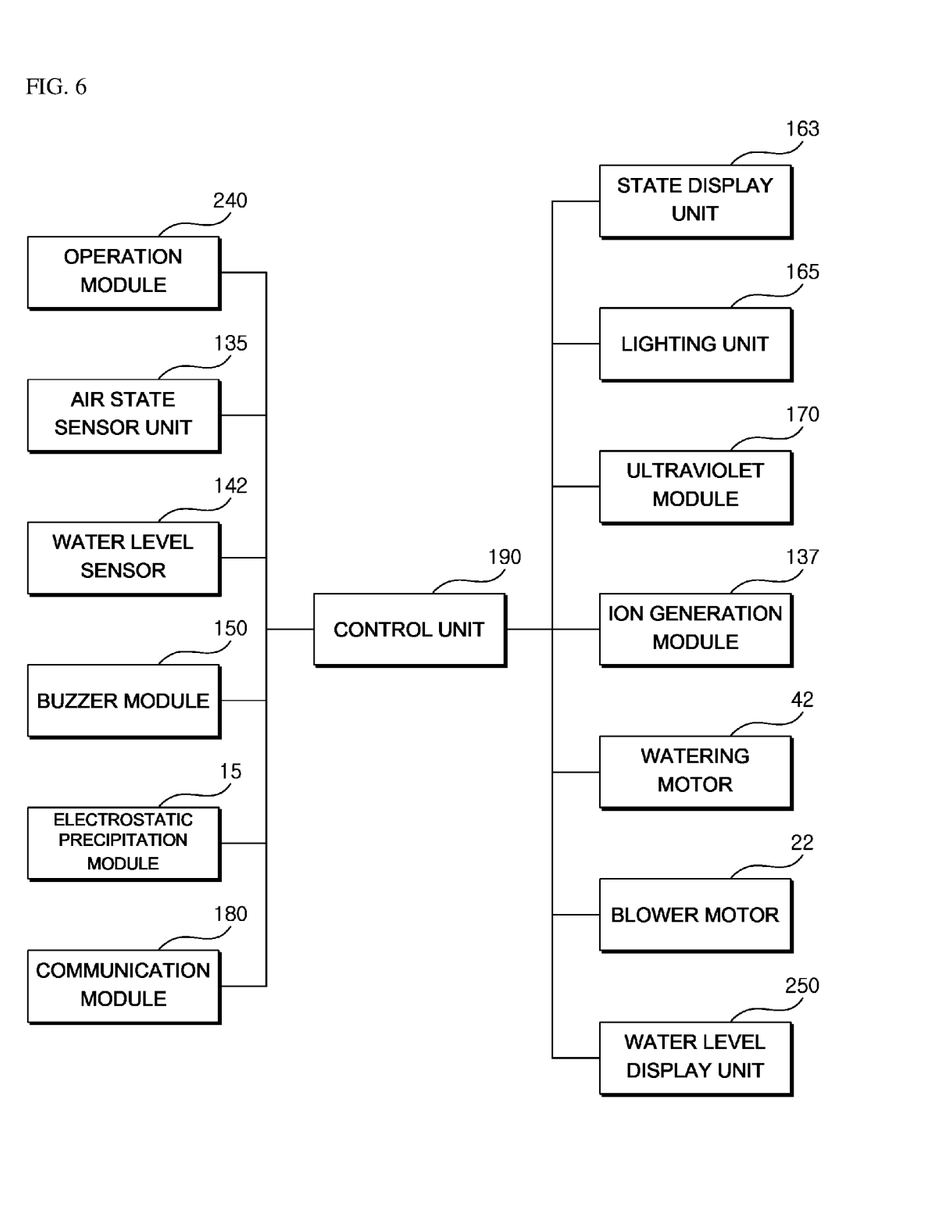
FIG. 6 is a block diagram of an air conditioner according to an embodiment of the present invention.

FIG. 6 is a block diagram of an air conditioner according to an embodiment of the present invention.

Since the operation module 240, the air state sensor unit 135, the water level sensor 142, the electrostatic precipitation module 15, the blower motor 22, the watering motor 42, the ion generation module 137, the ultraviolet module 170, the lighting unit 165, the state display unit 163, and the water level display unit 250 are identical to the above components, their descriptions will be omitted.

A communication module 180 may be communicably connected to a user's portable device and transmit a state of an air conditioner to the user's portable device. The communication module 180 may receive a user's instruction inputted through a user's portable device. The communication module 180 may be wirelessly connected to a portable device such as a user's mobile phone or tablet through wireless communication such as Wireless LAN (WLAN) (for example, Wi-Fi), 3G, or 4G LTE, Bluetooth, Radio Frequency Identification (RFID), and infrared Data Association (IrDA).

A buzzer module 150 may notify a state of an air conditioner through sound. The buzzer module 150 may notify an air state or an issue occurrence of an air conditioner through sound.

The control unit 190 may control the electrostatic precipitation module 15, the blower motor 22, the watering motor 42, the ion generation module 137, and/or the ultraviolet module 170 according to a user's instruction inputted through the operation module 240 or the communication module 180 and/or an air state measured by the air state sensor unit 135, and may notify or display an air state, a setting or state of an air conditioner, or a water level of the water tank 30 through the lighting unit 165, the state display unit 163, the water level display unit 250, the buzzer module 150, and/or the communication module 180, to a user.

In this embodiment, the control unit 190 may receive a signal from the water level sensor 142 to determine a water level of the water tank 30 and display the determined water level on the water level display unit 250 in a multi-stage. When it is determined that the measured water level drops, the control unit 190 may calculate a water level display change time and after waiting for the calculated water level display change time, display the changed water level on the water level display unit 250. The control unit 190 may determine a water level of the water tank 30 in five steps. The control unit 190 may display a water level of the water tank 30 on the water level display unit 250 in five steps. When it is determined that a water level of the water tank 30 is an empty level (that is, there is no water in the water tank 30), the control unit 190 may output sound through the buzzer module 150. If it is determined that a water level of the water tank 30 is an empty water level, the control unit 190 may stop an operation of the watering motor 42 or the watering motor 42 may not operate during the receiving of a user's humidification instruction. The control unit 190 may notify the determined water level of the water tank 30 to a user through the communication module 180.

Figure 7:
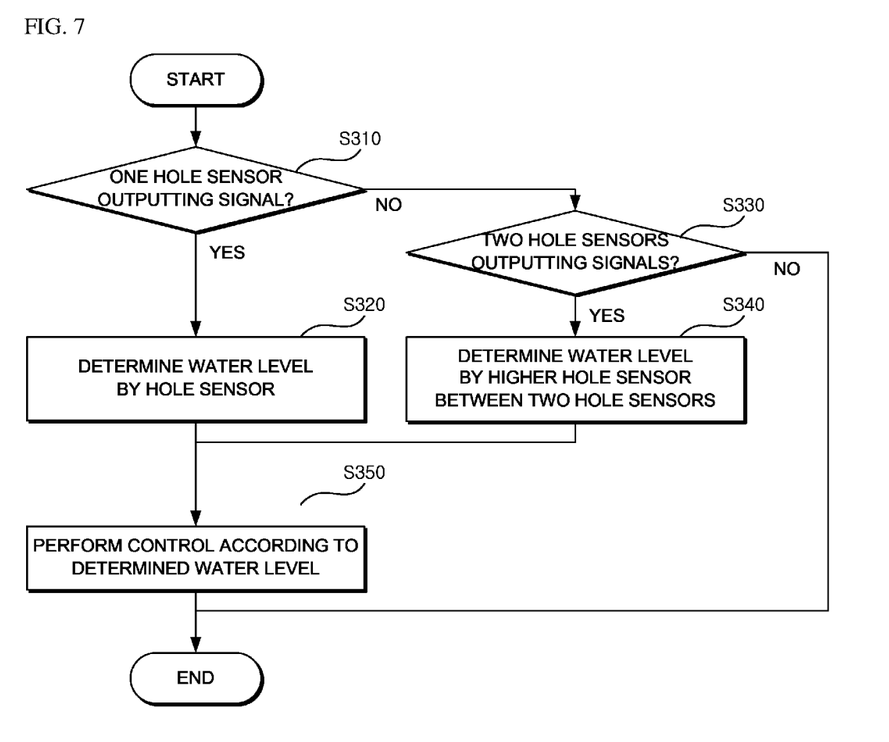
FIG. 7 is a flowchart illustrating a control method of an air conditioner according to an embodiment of the present invention.
Figure 8:
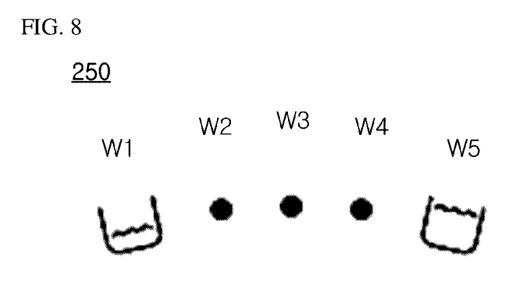
FIG. 8 is a view illustrating a water level of a water tank displayed on a water level display unit of an air conditioner according to an embodiment of the present invention.

FIG. 7 is a flowchart illustrating a control method of an air conditioner according to an embodiment of the present invention. FIG. 8 is a view illustrating a water level of a water tank displayed on a water level display unit of an air conditioner according to an embodiment of the present invention.

The control unit 190 may determine whether the hole sensor 142a that outputs a signal is one in operation S310.

Since the plurality of hole sensors 142a output different signals when detecting the magnetic force of the floater 33, the control unit 190 that receives a signal from the water level sensor 142 may determine how many signals are inputted.

If it is determined that the hole sensor 142a that outputs a signal is one, the control unit 190 may determine a water level of the water tank 30 through the hole sensor 142a where a signal is inputted and then, display the determined water level on the water level display unit 250 in operation S320.

The control unit 190 may determine that a water level of the water tank 30 is a first water level W1 (for example, an empty water) when an inputted signal is a signal of the first hole sensor 142a-1, determine that a water level of the water tank 30 is a second water level W2 higher than the first water level W1 when an inputted signal is a signal of the second hole sensor 142a-2, determine that a water level of the water tank 30 is a third water level W3 higher than the second water level W2 when an inputted signal is a signal of the third hole sensor 142a-3, determine that a water level of the water tank 30 is a fourth water level W4 higher than the third water level W3 when an inputted signal is a signal of the fourth hole sensor 142a-4, and determine that a water level of the water tank 30 is a fifth water level W5 higher than the fourth water level W4 when an inputted signal is a signal of the fifth hole sensor 142a-5.

When it is determined that the hole sensor 142a that outputs a signal is not one, the control unit 190 may determine whether the hole sensor 142a that outputs a signal is two in operation S330.

When it is determined that the hole sensor 142a that outputs a signal is not two, the control unit 190 may not determine a water level. As mentioned above, since one or two holes sensors 142a among the plurality of hole sensors 142a are designed to detect the magnetic force of the floater 33, when if there is no hole sensor 142a that outputs a signal or there are three or more hole sensors 142a that output a signal, this means an abnormal state, so that the water level sensor 142 may not determine a water level. According to an embodiment, when a case that it is determined that the hole sensor 142a that outputs a signal is not two is maintained for a predetermined time, the control unit 190 may notify a user that an error occurs through the state display unit 163, the buzzer module 150, and/or the communication module 180.

When it is determined that the hole sensor 142a that outputs a signal is two, the control unit 190 may determine a water level of the water tank 30 through the hole sensor 142a that is disposed higher than the hole sensor 142a that receives a signal and display the determined water level on the water level display unit 250 in operation S340.

When a water level is the empty water level W1 by determining the water level of the water tank 30 through a low hole sensor 142a among the hole sensors 142a that receive signals, even if there is water in the water tank 30, the watering motor 42 may stop. Additionally, when a water level is the fourth water level W4 by determining the water level of the water tank 30 through a low hole sensor 142a among the hole sensors 142a that receive signals, since an actual water level is higher than the fourth water level W4, if a user pours water in the top cover assembly 230, water overflow may occur. Accordingly, when it is determined that the hole sensor 142a that outputs a signal is two, the control unit 190 may determine the water level of the water tank 30 through a high hole sensor 142a among the hole sensors 142a that receive signals.

The control unit 190 may determine that the water level of the water tank 30 is the second water level W2 when inputted signals are signals of the first hole sensor 142a-1 and the second hole sensor 142a-2, determine that the water level of the water tank 30 is the third water level W3 when inputted signals are signals of the second hole sensor 142a-2 and the third hole sensor 142a-3, determine that the water level of the water tank 30 is the fourth water level W4 when inputted signals are signals of the third hole sensor 142a-3 and the fourth hole sensor 142a-4, and determine that the water level of the water tank 30 is the fifth water level W5 (for example, full water) when inputted signals are signals of the fourth hole sensor 142a-4 and the fifth hole sensor 142a-5.

The control unit 190 performs a control according to the determined water level in operation S350.

The control unit 190 may display the determined water level on the water level display unit 250 in five steps as shown in FIG. 8. The control unit 190 may notify the determined water level of the water tank 30 in five steps to a user through the communication module 180.

When it is determined that the water level of the water tank 30 is an empty water level, the control unit 190 may display the empty water level W1 on the water level display unit 250 and output sound through the buzzer module 150, and then stop an operation of the watering motor 42 to stop a rotation of the watering housing 44, or prevent an operation of the watering motor 42 not to rotate the watering housing 44.

When it is determined that the water level of the water tank 30 drops, the control unit 190 may perform a control method described later.

Figure 9:
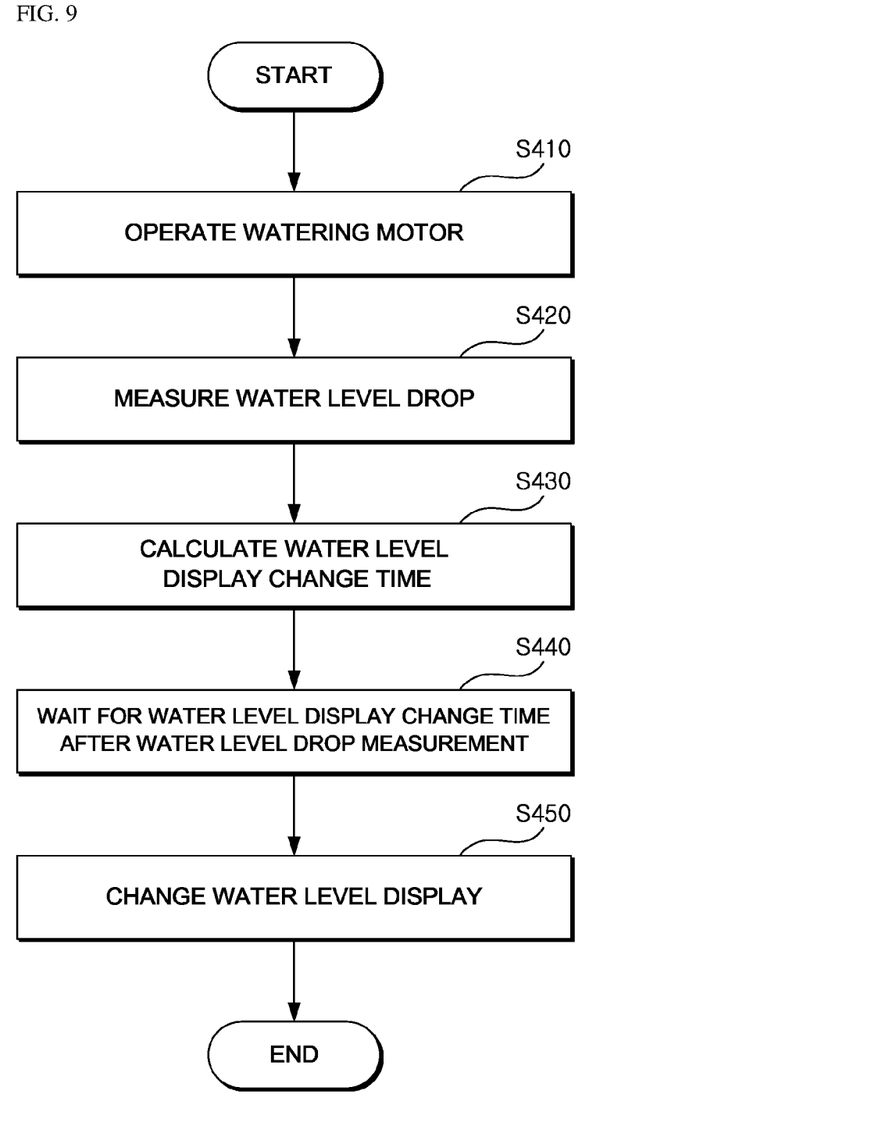
FIG. 9 is a flowchart illustrating a control method when a water level of an air conditioner drops according to an embodiment of the present invention.

FIG. 9 is a flowchart illustrating a control method when a water level of an air conditioner drops according to an embodiment of the present invention.

The control unit 190 may operate the watering motor 42 to rotate the watering housing 44 in operation S410. A user may select an operation mode by operating the operation module 240 or when a user inputs a humidification instruction, the control unit 190 may operate the watering motor 42. When the watering motor 42 operates, the watering housing 44 may rotate to draw and spray water in the water tank 30. During an operation of the watering motor 42, the water level sensor 142 may measure a water level of the water tank 30.

The water level sensor 142 may measure a water level drop of the water tank 30 in operation S420.

Since each of the plurality of hole sensors 142a outputs a different signal as detecting the magnetic force of the floater 33, if a water level drops by one step, the water level sensor 142 may change an outputted signal from a signal of one hole sensor 142a into a signal of another hole sensor 142a that is disposed below the corresponding hole sensor 142a.

When a signal inputted from the water level sensor 142 is changed from a signal of one hole sensor 142a into a signal of another hole sensor 142a that is disposed below the corresponding hole sensor 142a, the control unit 190 may determine that the water level sensor 142 measures a water level drop of the water tank 30. When a changed signal of the hole sensor 142a is inputted continuously for a predetermined time (for example, 3 seconds in this embodiment), the control unit 190 may determine that a measured water level drops.

For example, when an inputted signal is changed from a signal of the fourth hole sensor 142a-4 to a signal of the third hole sensor 142a-3 and maintained for more than 3 seconds, the control unit 190 may determine that the water level sensor 142 measures one step drop of a water level of the water tank 30.

The control unit 190 may calculate a water level display change time by using the amount of water in the water tank 30, the visual body 210, and/or the watering housing 44 (hereinafter referred to as unmeasurable amount) and an evaporation rate that is the amount of evaporated water per hour due to humidification in operation S430. The unmeasurable amount is the amount of water that is recovered into the water tank 30 after an operation stop of the watering motor 42.

The control unit 190 may calculate a water level display change time by dividing the unmeasurable amount by the evaporation rate.

Since the unmeasurable amount is uniform relatively according to the rotating speed of the watering housing 44 and/or the rotating speed of the blower fan 24, the control unit 190 may obtain a unmeasurable amount under the current operation condition by referring to a lookup table for pre-stored unmeasurable amounts. According to an embodiment, the control unit 190 may obtain a unmeasurable amount through a water level change of the water tank 30 due to an operation start of the watering motor 42. Since the evaporation rate is uniform relatively according to the rotating speed of the watering housing 44, the rotating speed of the blower fan 24, and/or a relative humidity measured by the air state sensor unit 135, the control unit 190 may obtain an evaporation rate under the current operation condition by referring to a lookup table for pre-stored evaporation rate. According to an embodiment, the control unit 190 may obtain an evaporation rate through a water level change value of the water tank 30 during an operation of the watering motor 42.

In this embodiment, when a unmeasurable amount is m and an evaporation rate is n, a water level display change time is $T=m/n$.

The control unit 190 may wait for the calculated water level display change time after measuring a water level drop of the water level sensor 142 in operation S440. The control unit 190 may wait for a water level display change time calculated from a time point that the water level sensor 142 measures a water level drop of the water tank 30. The control unit 190 may wait for a water level display change time from a time point that an inputted signal is changed from a signal of one hole sensor 142a into a signal of another hole sensor 142a that is disposed below the corresponding hole sensor 142a.

In this embodiment, when it is assumed that the amount of water when the water level sensor 142 measures a water level drop is V, the amount of water that is actually contained in a water tank when the water level drop is measured is $V+m$. Since the water level display change time is $T=m/n$, the amount of water evaporated when the water level display change time elapses is $(m/n)*n=m$. When the water level display change time elapses, since the amount of water corresponding to a water level of the water tank 30 is $V-m$, the amount of water that is actually contained in a water tank is $V-m+m=V$, which is increased by m. That is, after the water level sensor 142 measures a water level drop, it is required to wait for a water level display change time, so that an actual water level becomes a water level when the water level drop is measured.

After the water level display change time, the control unit 190 may change a water level of the water tank 30 displayed on the water level display unit 250 in operation S450. In this embodiment, the control unit 190 may change a water level of the water tank 30, which was the third water level W3 before the water level drop of the water tank 30 and displayed on the water level display unit 250, into the second water level W2. The control unit 190 may turn off the display of the fifth water level W5 (that is, full water) of the water level display unit 250, which was a water level of the water tank 30 before the water level drop of the water tank 30 and then, display the fourth water level W4 on the water level display unit 250. The control unit 190 may display that a water level of the water tank 30 was the second water level W2 before the water level drop of the water tank 30 and then, display the first water level W1 (that is, empty water) on the water level display unit 250.

When displaying the first water level W1 (that is, empty water) on the water level display unit 250, the control unit 190 may output sound through the buzzer module 150 and stop an operation of the watering motor 42 to stop the rotation of the watering housing 44.

An air conditioner and a control method thereof according to an exemplary embodiment of the present invention have at least one of the following effects.

As a water level of a water tank is displayed in a multi-stage, a user can easily predict a water filling timing or recognize that a water level becomes close to the full water.

As a water level of a water tank is displayed beside a water supply hole for supplying water, when a user supplies water while looking at the water supply hole, a water level can be recognized without moving the line of sight.

By using a plurality of hole sensors, a water level of a water tank can be measured without interruption from the empty water to the full water in a water tank.

Since a water level is measured continuously when water is poured from the upper side to a water tank, water overflow can be prevented.

By determining a water level through a high hole sensor when signals are outputted from two hole sensors, malfunction due to a wrong empty water determination can be prevented and water overflow during a user's water supply can be prevented.

By complementing a case that an actual water level is different from a measured water level due to an operation of a waterwheel, a water level can be displayed accurately.

As a time calculated after a water level drop of a water tank is measured is waited and a water level display is changed, an accurate water level can be notified to a user.

A waiting time before a water level display is changed after the measuring of the water level drop of a water tank can be accurately calculated relatively.

By notifying a user that there is no water in a water tank, a user can be prevented from supplying water to the water tank unnecessarily.

Water overflow due to a wrong full water display of a water tank can be prevented when a user supplies water.

A confusing water level display when a water level of a water tank is up as a waterwheel stops rotating can be prevented.

The effects of the present invention are not limited to the above; other effects that are not described herein will be clearly understood by the persons skilled in the art from the following claims.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An air conditioner comprising:
a water tank to store water;
a visual body disposed over the water tank and formed of a transparent material;
a watering housing to draw water stored in the water tank and to spray the drawn water to the visual body;
a water level sensor to measure a water level of the water tank in a multi-stage;
a top cover assembly disposed over the visual body and having a water supply hole to supply water to the water tank; and
a water level display unit disposed beside the water supply hole of the top cover assembly to display a water level measured by the water level sensor in a multi-stage.

2. An air conditioner of claim 1, wherein:
the water tank comprises a floater to move vertically according to a water level of the water tank and to generate a magnetic force,
the water level sensor comprises a plurality of hole sensors to detect a magnetic force generated by the floater and to output a signal, and
at least one of the plurality of hole sensors detects a magnetic force generated by the floater to output a signal.

3. The air conditioner of claim 2, further comprising a control unit to receive a signal from the water level sensor to determine a water level of the water tank,
wherein when there is one hole sensor outputting a signal among the plurality of hole sensors, the control unit determines a water level of the water tank by the one hole sensor outputting the signal and displays the determined water level on the water level display unit, and
wherein when there are two hole sensors outputting signals among the plurality of hole sensors, determines a water level of the water tank by the hole sensor disposed higher between the two hole sensors outputting the signals and displays the determined water level on the water level display unit.

4. The air conditioner of claim 3, further comprising a watering motor to rotate the watering housing,
wherein when is the control unit determines that there is no water in the water tank, the control unit stops an operation of the watering motor.

5. The air conditioner of claim 1, further comprising a control unit to wait for a water level display change time after the water level sensor measures a water level drop of the water tank and to change a water level displayed on the water level display unit.

6. The air conditioner of claim 5, wherein the control unit calculates the water level display change time from an unmeasurable amount, that is the amount of water recovered in the water tank after the stopping of the operation of the watering motor, and an evaporation rate, that is the amount of evaporated water per hour due to humidification.

7. A control method of an air conditioner comprising a water tank to store water, a water level sensor comprising a plurality of hole sensors to measure a water level of the water tank in a multi-stage, a floater disposed at the water tank to move vertically according to a water level, and a water level display unit to display a water level measured by the water level sensor in a multi-stage, the control method comprising:
when there is one hole sensor outputting a signal by detecting a magnetic force generated by the floater, determining a water level of the water tank by the one hole sensor outputting the signal; and when there are two hole sensors outputting signals by detecting a magnetic force generated by the floater among the plurality of hole sensors, determining a water level of the water tank by the hole sensor disposed higher between the two hole sensors outputting the signals.

8. The control method of claim 7, further comprising displaying the determined water level of the water tank on a water level display unit disposed beside a water supply hole to supply water to the water tank and to display a water level measured by the water level sensor in a multi-stage.

9. The control method of claim 7, further comprising:
measuring, by the water level sensor, a water level drop of the water tank;
waiting for a water level display change time after measuring the water level drop of the water tank; and
displaying a water level change on the water level display unit, disposed beside the water supply hole for supplying water to the water tank, after the water level display change time.

10. The control method of claim 9, wherein the water level display change time is calculated from an unmeasurable amount, that is the amount of water recovered in the water tank after stopping an operation of a watering motor, and an evaporation rate, that is the amount of evaporated water per hour due to humidification.

11. The control method of claim 7, further comprising, when it is determined that there is no water in the water tank, stopping spraying water stored in the water tank.

\* \* \* \* \*